(12) United States Patent
Bs et al.

(10) Patent No.: US 9,665,473 B2
(45) Date of Patent: May 30, 2017

(54) SMART TESTER APPLICATION FOR TESTING OTHER APPLICATIONS

(71) Applicant: Accenture Global Services Limited, Dublin (IE)

(72) Inventors: Vijay Krishna Bs, Bangalore (IN); Bidhu Sahoo, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 229 days.

(21) Appl. No.: 14/273,102

(22) Filed: May 8, 2014

(65) Prior Publication Data
US 2015/0278076 A1 Oct. 1, 2015

(30) Foreign Application Priority Data

Mar. 25, 2014 (IN) ............................ 1610/CHE/2014

(51) Int. Cl.
*G06F 11/36* (2006.01)
(52) U.S. Cl.
CPC ...... *G06F 11/3684* (2013.01); *G06F 11/3664* (2013.01)
(58) Field of Classification Search
USPC ...................................................... 714/32, 38
See application file for complete search history.

(56) References Cited

U.S. PATENT DOCUMENTS

| | | | |
|---|---|---|---|
| 6,587,969 B1 * | 7/2003 | Weinberg | G06F 11/3688 714/38.13 |
| 7,694,181 B2 | 4/2010 | Noller et al. | |
| 7,774,757 B1 | 8/2010 | Awasthi et al. | |
| 7,908,590 B1 * | 3/2011 | Min | G06F 11/3684 717/124 |
| 8,230,267 B2 | 7/2012 | Noller et al. | |
| 8,463,874 B2 * | 6/2013 | Nakamura | G06F 11/3414 709/219 |

(Continued)

FOREIGN PATENT DOCUMENTS

WO WO 2013/090298 6/2013

OTHER PUBLICATIONS

IBM, "Movile testing with IBM Rational Test Workbench" http://www.ibm.com/developerworks/rational/library/mobile-testing-rational-test-workbench/index.html?ca=dat-, Aug. 27, 2013, 14 pages.

(Continued)

*Primary Examiner* — Kamini Patel
(74) *Attorney, Agent, or Firm* — Harrity & Harrity, LLP

(57) ABSTRACT

A device may be configured to receive, from a first device, first test scripts for testing an application. The first test scripts may include information for reproducing interactions with the application on the first device. The device may generate second test scripts, for testing the application on a second device, that reproduce the interactions with the application on the second device. The second test scripts may be generated based on the first test scripts and mapping information that maps resources of the first device to resources of the second device. The first device and the second device may be different device types. The device may provide the second test scripts to the second device. The device may receive and store test results of executing the second test scripts on the second device that indicate results of reproducing the interactions on the second device.

20 Claims, 11 Drawing Sheets

(56) References Cited

U.S. PATENT DOCUMENTS

| | | | |
|---|---|---|---|
| 8,566,648 B2* | 10/2013 | Schroeder | G06F 11/3672 714/38.14 |
| 2007/0168757 A1* | 7/2007 | Kobrosly | G06F 11/079 714/46 |
| 2007/0220494 A1 | 9/2007 | Spooner | |
| 2007/0234293 A1* | 10/2007 | Noller | G06F 11/3688 717/124 |
| 2008/0126931 A1* | 5/2008 | Kojima | G06F 9/4443 715/704 |
| 2008/0229288 A1* | 9/2008 | Nelson | G06F 11/3636 717/127 |
| 2010/0235807 A1* | 9/2010 | Doddappa | G06F 8/10 717/101 |
| 2012/0198279 A1* | 8/2012 | Schroeder | G06F 11/3672 714/32 |
| 2013/0054792 A1 | 2/2013 | Sharaf | |
| 2013/0132774 A1 | 5/2013 | Somendra | |
| 2013/0159784 A1* | 6/2013 | Rossi | G06F 11/263 714/47.1 |
| 2013/0179858 A1 | 7/2013 | Mecke et al. | |
| 2014/0229920 A1* | 8/2014 | Rossi | G06F 11/3664 717/125 |
| 2014/0282425 A1* | 9/2014 | Zhao | G06F 11/3688 717/127 |
| 2014/0331205 A1* | 11/2014 | Singh | G06F 11/3688 717/124 |
| 2014/0331209 A1* | 11/2014 | Singh | G06F 11/3688 717/127 |

OTHER PUBLICATIONS

Zhang et al., "Environment Modeling for Automated Testing of Cloud Applications", Software, IEEE, vol. 29, No. 2, Mar.-Apr. 2012, 10 pages.

Soasta, "TouchTest" http://www.soasta.com/products/touchtest/, Jul. 3, 2012, 4 pages.

Ranorex GmbH, "Android Testing", http://www.ranorex.com/support/user-guide-20/android-testing.html, May 31, 2012, 10 pages.

Oleg Prosaynik, "Load Testing Mobile Apps. But Made Easy.", http://blazemeter.com/blog/load-testing-mobile-apps-made-easy, Mar. 28, 2013, 7 pages.

NTT Resonant Inc., "Revolutionizing Mobile Apps Testing", http://appkitbox.com/en/testkit?glu00085&gclid=ClutieDm_7sCFYEl4godMiUAfw, Nov. 7, 2013, 2 pages.

Blue Fish Development Group, "Introduction to the WDK Automated Test Framework", http://www.bluefishgroup.com/2008/wdk-test-framework/, Aug. 27, 2008, 21 pages.

Wipro Limited, "Mobility Testing", http://www.wipro.com/services/mobility-segments/mobility-testing.aspx, Apr. 1, 2013, 2 pages.

SmartBear Software, "Automated Test Recording—TestComplete", http://smartbear.com/products/ga-tools/automated-testing-tools/creating-automated-tests/automated-test-recording-engine/, Mar. 10, 2009, 3 pages.

* cited by examiner

SMART TESTER APPLICATION FOR TESTING OTHER APPLICATIONS

RELATED APPLICATION

This application claims priority to Indian Patent Application No. 1610/CHE/2014, filed on Mar. 25, 2014, the content of which is incorporated by reference herein in its entirety.

BACKGROUND

An application (e.g., a computer program) may be executable on different device types and/or available on different operating systems. For example, an application may be both available for a first device running a first operating system and for a second device running a second operating system. However, the application may need to be tested to ensure the application executes properly on the different device types and/or on devices in different environments. An expert tester may be required to personally test each of the different device types and may even have to root the devices in some cases. Additionally, the testing may need to be done in specialized labs that simulate different test environments.

SUMMARY

Implementations described herein may provide a device configured to receive, from a first device, first test scripts for testing an application. The first test scripts may include information for reproducing interactions with the application on the first device. The device may generate second test scripts, for testing the application on a second device, that reproduce the interactions with the application on the second device. The second test scripts may be generated based on the first test scripts and mapping information that maps resources of the first device to resources of the second device. The first device and the second device may be different device types. The device may provide the second test scripts to the second device. The device may receive test results of executing the second test scripts on the second device that indicate results of reproducing the interactions with the application on the second device, and the device may store the test results.

Implementations described herein may provide a computer-readable medium that stores instructions. The instructions, when executed by a processor of a device, may cause the processor to receive, from a first device, first test scripts for testing an application. The first test scripts may include information for automatically reproducing interactions with the application on the first device. The instructions may cause the processor to create second test scripts, for testing the application on a second device, that automatically reproduce the interactions with the application on the second device. The second test scripts may be generated based on the first test scripts and mapping information that associates resources of the first device with resources of the second device. The first device and the second device may be different device types. The instructions may cause the processor to send the second test scripts to the second device. The instructions may cause the processor to receive test results of executing the second test scripts on the second device that indicate results of automatically reproducing the interactions with the application on the second device, and store the test results.

Implementations described herein may provide a method that includes receiving, by a server device, first test scripts for testing an application from a first device. The first test scripts may include information for reproducing interactions with the application on the first device. The method may include storing, by the server device, mapping information that maps resources of the first device to resources of a second device. The first device and the second device may be different device types. The method may include generating, by the server device, second test scripts, for testing the application on the second device, that reproduce the interactions with the application on the second device. The second test scripts may be generated based on the first test scripts and the mapping information. The method may include providing, by the server device, the second test scripts to the second device. The method may include receiving, by the server device, test results of executing the second test scripts on the second device that indicate results of reproducing the interactions with the application on the second device. The method may include storing, by the server device, the test results.

DETAILED DESCRIPTION

The following detailed description of example implementations refers to the accompanying drawings. The same reference numbers in different drawings may identify the same or similar elements.

Requiring an expert tester to test an application on multiple different device types may be time consuming, expensive, and difficult. Moreover, using specialized labs to simulate different geographic locations or test environments may be expensive, and may not accurately reflect the true environments in which devices will actually execute the application. Accordingly, the test results obtained from expert and/or lab testing may not be accurate.

Implementations described herein may provide a smart tester application for testing an application across multiple device types and multiple geographic locations (e.g., test environments). In some implementations, the smart tester application may allow an expert tester (e.g., a test designer) to generate a master test that will be used as the basis for testing devices of different device types. Moreover, the smart tester application may allow non-expert testers (e.g., test executors) to execute the master test, generated by the expert tester, on different devices in different geographic locations.

Figure 1:
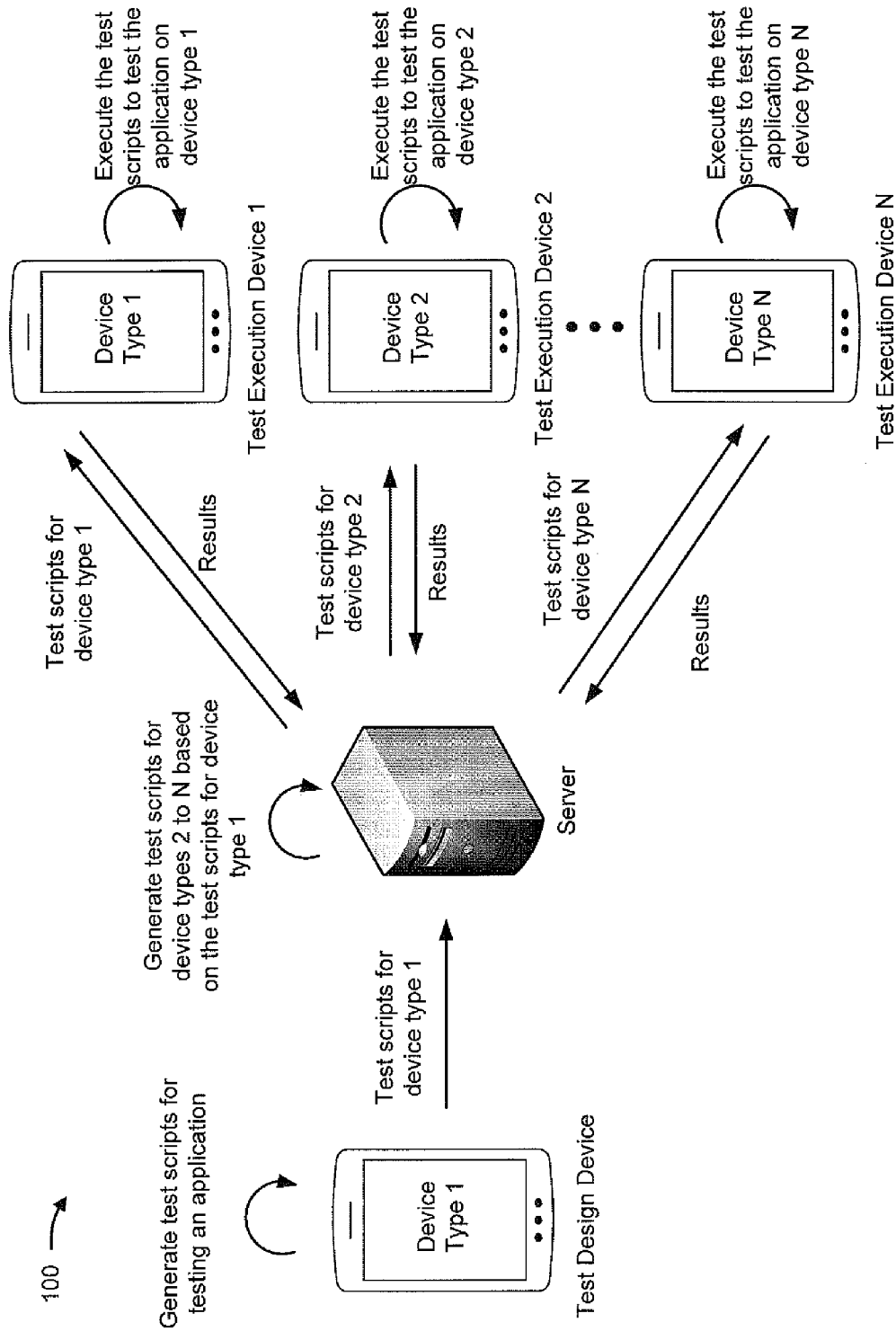
FIG. 1 is a diagram of an overview of an example implementation described herein.

FIG. 1 is a diagram of an overview of an example implementation 100 described herein. Assume a test designer operates a test design device of a device type 1.

Further, assume the test design device has access to an application under test and has a smart tester application installed for testing the application under test. The test designer may execute the smart tester application and the application under test. The test designer may create a test scenario including a series of interactions with the application under test that are input by the test designer that tests whether the application under test is working properly. The smart tester application may record the interactions with the application under test and generate test scripts for reproducing the test scenario based on the recorded interactions. The test scripts may be generated for device type 1 because the test design device (e.g., a device of device type 1) was used to generate the test scripts. The test design device may send the test scripts to a server.

The server may receive the test scripts, from the test design device, that are for device type 1. Assume the server stores mapping files that map resources (e.g., objects, buttons, images, commands, etc.) between different device types. The server may generate test scripts for device types 2 to N based on the mapping files and the test scripts for device type 1. The test scripts for device types 2 to N may be used to reproduce the test scenario, created by the test designer for testing the application under test, on devices of device types 2 to N. The server may send each of the test scripts to respective test execution devices 1 to N of device types 1 to N.

Assume test executors operate test execution devices 1 to N, which are located at varying geographic locations. Further, assume each test execution device has access to the application under test and has the smart tester application installed for testing the application under test. Each of the test execution devices 1 to N may receive respective test scripts for the respective device types 1 to N. The test executors may execute the test scripts using the smart tester application to automatically reproduce the test scenario without the test executors having to input each interaction included in the test scenario. The smart tester application may cause test execution devices 1 to N to record screen events for each of the interactions. Test execution devices 1 to N may generate results based on the recorded screen events and send the results to the server. Or, the results may include the recorded screen events.

The server may receive the results from test execution devices 1 to N. The server may compile the results and provide the compilation to interested parties. For example, the server may provide the results to a developer responsible for revising the program code of the application under test to fix any problems indicated by the results.

In this way, the application under test may be tested by different device types in varying geographic locations. Moreover, expert testers may not be personally required to test the application under test on devices of the different device types because non-experts may automatically reproduce the test scenario created by the expert tester (e.g., the test designer).

Figure 2:
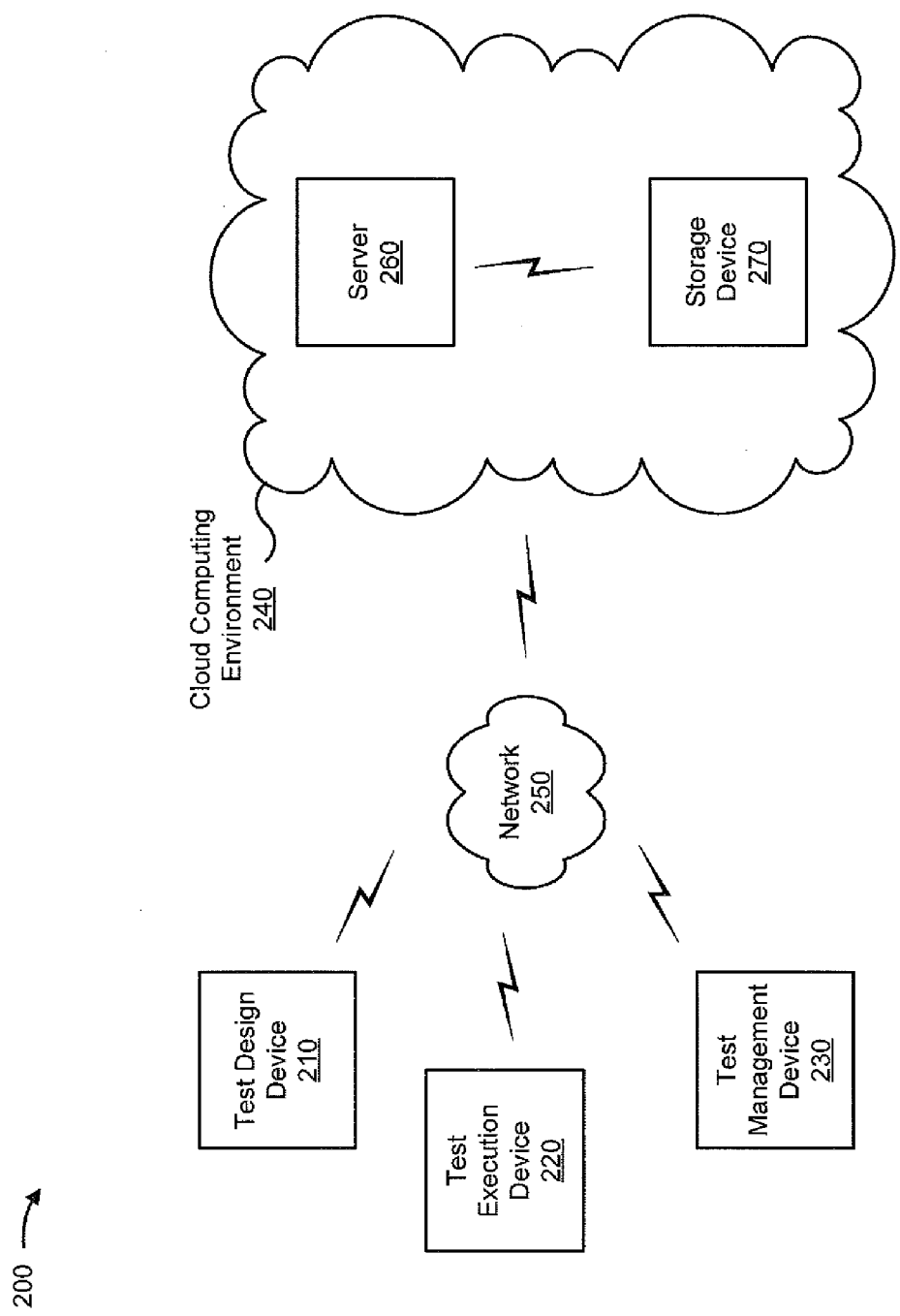
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a test design device 210, a test execution device 220, a test management device 230, a cloud computing environment 240, and/or a network 250.

Test design device 210 may include a device capable of receiving, processing, and/or providing information. For example, test design device 210 may include a mobile phone (e.g., a smart phone, a radiotelephone, etc.), a computing device (e.g., a desktop computer, a laptop computer, a tablet computer, a handheld computer, a game console, etc.), or a similar device. In some implementations, test design device 210 may include a communication interface that allows test design device 210 to receive information from and/or transmit information to other devices in environment 200. In some implementations, test design device 210 may be capable of generating test scripts for a test project, managing the test project, and/or receiving results for the test project.

Test execution device 220 may include a device capable of receiving, processing, and/or providing information. For example, test execution device 220 may include a mobile phone (e.g., a smart phone, a radiotelephone, etc.), a computing device (e.g., a desktop computer, a laptop computer, a tablet computer, a handheld computer, a game console, etc.), or a similar device. In some implementations, test execution device 220 may include a communication interface that allows test execution device 220 to receive information from and/or transmit information to other devices in environment 200. In some implementations, test execution device 220 may be capable of executing test scripts for a test project, managing the test project, and/or receiving results for the test project.

Test management device 230 may include a device capable of receiving, processing, and/or providing information. For example, test management device 230 may include a mobile phone (e.g., a smart phone, a radiotelephone, etc.), a computing device (e.g., a desktop computer, a laptop computer, a tablet computer, a handheld computer, a game console, etc.), or a similar device. In some implementations, test management device 230 may include a communication interface that allows test management device 230 to receive information from and/or transmit information to other devices in environment 200. In some implementations, test management device 230 may be capable of managing a test project and/or receiving results for the test project.

Cloud computing environment 240 may include an environment that delivers computing as a service, whereby shared resources, services, etc. may be provided to test design device 210, test execution device 220, and/or test management device 230. Cloud computing environment 240 may provide computation, software, data access, storage, etc. services that do not require end-user knowledge of a physical location and configuration of a system and/or a device that delivers the services. As shown, cloud computing environment 240 may include a server 260 and a storage device 270.

Server 260 may include one or more server devices capable of storing, processing, and/or routing information. In some implementations, server 260 may include a communication interface that allows server 260 to receive information from and/or transmit information to other devices in environment 200.

Storage device 270 may include one or more devices capable of storing, processing, and/or routing information. In some implementations, storage device 270 may include a communication interface that allows storage device 270 to receive information from and/or transmit information to other devices in environment 200.

Network 250 may include one or more wired and/or wireless networks. For example, network 250 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
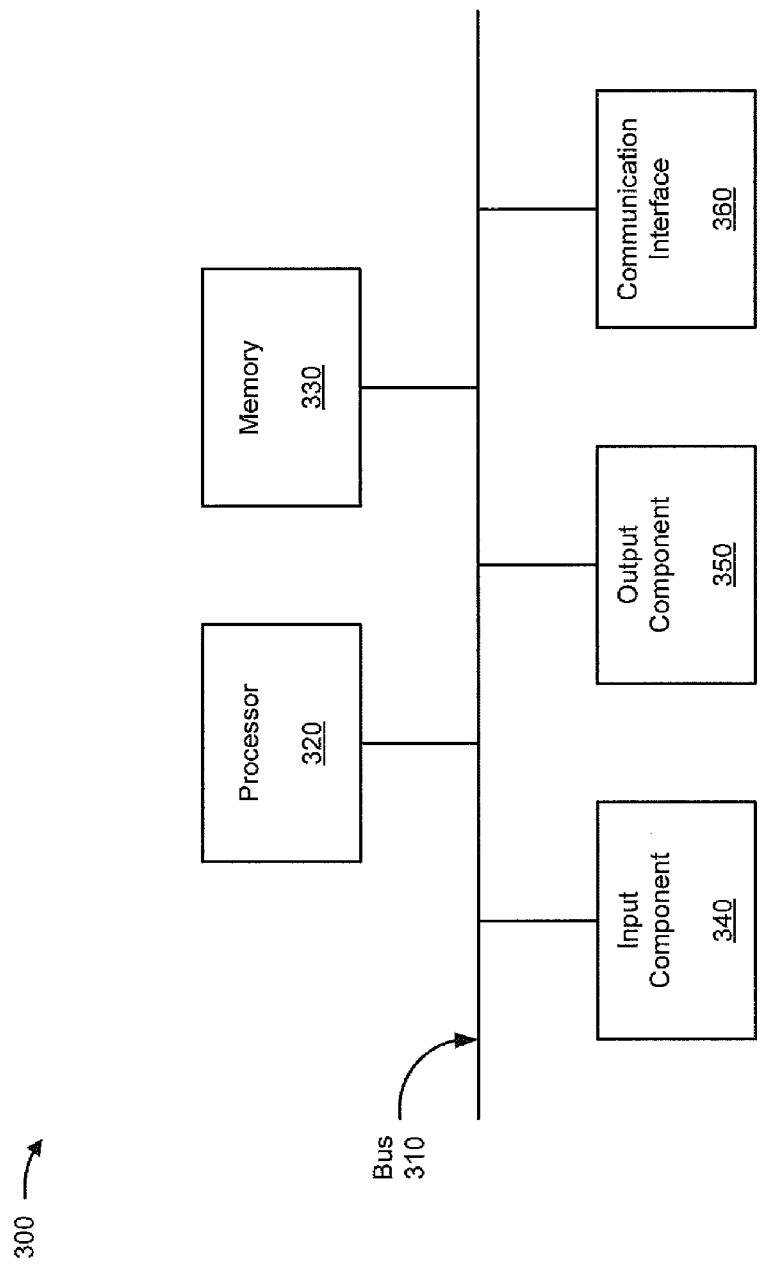
FIG. 3 is a diagram of example components of a device that corresponds to one or more devices of FIG. 2.

FIG. 3 is a diagram of example components of a device 300 that corresponds to one or more devices of FIG. 2. Device 300 may correspond to test design device 210, test execution device 220, test management device 230, server 260, and/or storage device 270. Additionally, or alternatively, test design device 210, test execution device 220, test management device 230, server 260, and/or storage device 270 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, a microphone, etc.). Additionally, or alternatively, input component 340 may include a sensor for sensing information.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
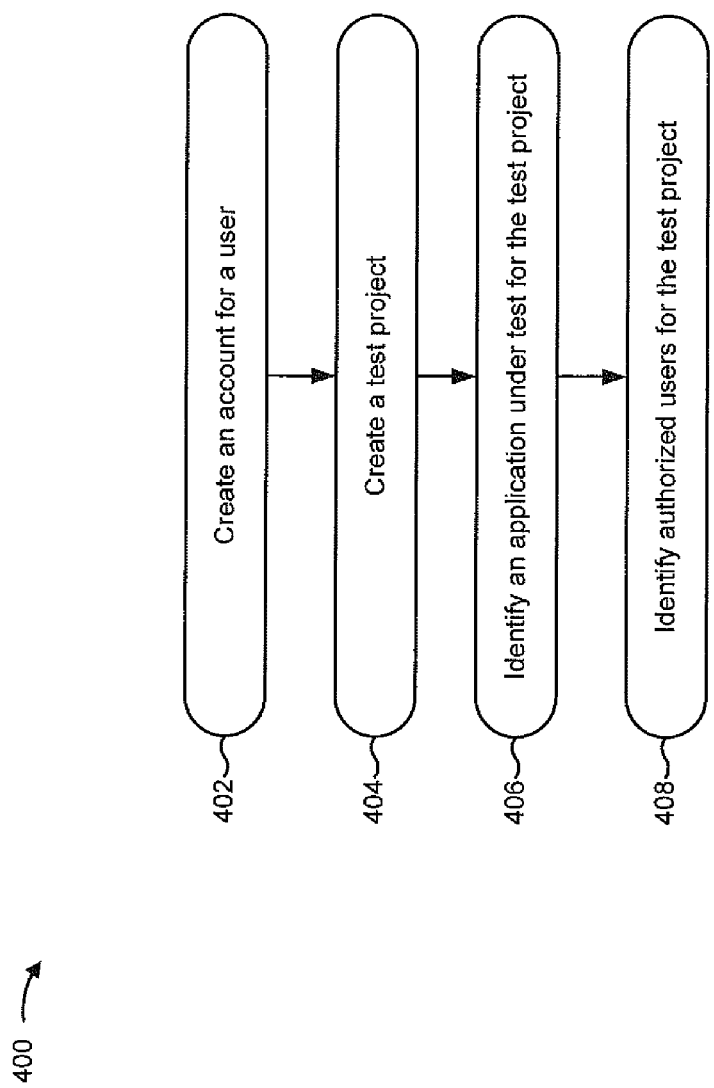
FIG. 4 is a flowchart of an example process for generating a test project.

FIG. 4 is a flowchart of an example process 400 for generating a test project. In some implementations, one or more process blocks of FIG. 4 may be performed by server 260. Additionally, or alternatively, one or more process blocks of FIG. 4 may be performed by another device or a group of devices separate from or including server 260.

As shown in FIG. 4, process 400 may include creating an account for a user (block 402). For example, server 260 may create the account for the user.

In some implementations, a user may use test design device 210, test execution device 220, test management device 230, and/or another device to send a request to create an account to server 260. The user, via test design device 210, test execution device 220, test management device 230, and/or the other device, may send account information specifying user identifier information (e.g., a username), user authentication information (e.g., a password, biometric information, etc.), a name, and/or contact information (e.g., an email address, a phone number, etc.).

Server 260 may receive the request and the account information. Server 260 may create the account based on the request by creating an entry for the account in an account data structure stored in a memory of server 260 and/or storage device 270. The account (e.g., the entry) may associate the user identifier information, the user authentication information, the user name, and the contact information. Additionally, or alternatively, the account may include an account identifier. The account identifier may include a string of characters of any length that uniquely identifies the account.

Server 260 may create multiple accounts for multiple users and may generate an entry in the account data structure for each account.

As further shown in FIG. 4, process 400 may include creating a test project (block 404). For example, server 260 may create the test project.

In some implementations, a user may use test design device 210, test execution device 220, test management device 230, and/or another device to send a request to create a test project to server 260. Server 260 may receive the request to create the test project. Server 260 may create the test project based on the request by creating an entry for the test project in a test project data structure stored in a memory of server 260 and/or storage device 270. The test project may include a test project identifier. The test project identifier may include a string of characters of any length that uniquely identifies the test project.

Server 260 may create multiple test projects and may generate an entry in the test project data structure for each test project.

As further shown in FIG. 4, process 400 may include identifying an application under test for the test project (block 406). For example, server 260 may identify the application under test for the test project. The application under test is an application to be tested using the smart tester application.

A user may select an application as the application under test and input the selection into test design device 210, test execution device 220, test management device 230, and/or another device. Test design device 210, test execution device 220, test management device 230, and/or the other device may send an application under test identifier identifying the selected application under test, to server 260. Server 260 may receive the application under test identifier and store the application under test identifier in the test project account for the test project.

As further shown in FIG. 4, process 400 may include identifying authorized users for the test project (block 408). For example, server 260 may identify the authorized users.

A user, that sent the request to create the test project, may be an authorized user for the test project. Server 260 may designate this user as a test manager. The test manager has full access to the test project and may edit or delete the test project.

The test manager may select other users as authorized users for the test project. For example, the test manager may input user information indicating names, usernames, and/or contact information (e.g., an email addresses, a phone numbers, etc.) associated with users into test design device 210, text execution device 220, test management device 230, and/or another device. Test design device 210, text execution device 220, test management device 230, and/or the other device may send the user information to server 260 and server 260 may receive the user information. Server 260 may use the user information to query the account data structure and identify accounts associated with the users. Server 260 may add users of the identified accounts as authorized users for the test project. For example, server 260 may store account identifiers for the identified accounts in the entry for the test project in the test project data structure.

In some implementations, the test manager may designate a user type for each of the authorized users. For example, the test manager may input user type information identifying a user type for each user into test design device 210, text execution device 220, test management device 230, and/or another device. Test design device 210, text execution device 220, test management device 230, and/or the other device may send the user type information to server 260 and server 260 may receive the user type information. Server 260 may store a user type identifier, which identifies the user type indicated by the user type information, to be associated with the account identifier for each of the authorized users in the entry for the test project in the test project data structure.

Each user type may be associated with different permissions and/or access to the test project. A user type may include a test designer, a test executor, a viewer, and/or a test manager. A test designer may be permitted to create test scripts for testing an application under test. A test executor may be permitted to execute the test scripts to test the application under test. In some implementations, the test manager may designate that anyone executing the smart tester application is a test executor. A viewer may be permitted to access some or all test results of tests run by test executors. For example, a viewer may be a developer responsible for fixing defects in the application under test and may need access to all test results. Additionally, or alternatively, a viewer may be a stakeholder responsible for project management and/or budgeting, and may only need access to an overview or summary of the test results. A test manager may have full access to the test project, including all the permissions of the test designer, the test executor, and the viewer. In some implementations, the test manager may be able to edit or delete the test project. A user may be associated with one more user types. For example, a user may be a test designer and a viewer.

In some implementations, server 260 may update an account for a user to indicate test projects that the user is authorized to access. For example, an account in the account data structure may be updated to include a test project identifier identifying the test project. Additionally, or alternatively, the account may be updated to include a user type identifier associated with the test project identifier that indicates a user type for the user for the associated test project. For example, the account may indicate that the associated user is a viewer for a first test project, and a test reporter for a second test project.

While a series of blocks has been described with regard to FIG. 4, the blocks and/or the order of the blocks may be modified in some implementations. Additionally, or alternatively, non-dependent blocks may be performed in parallel.

Figure 5A:
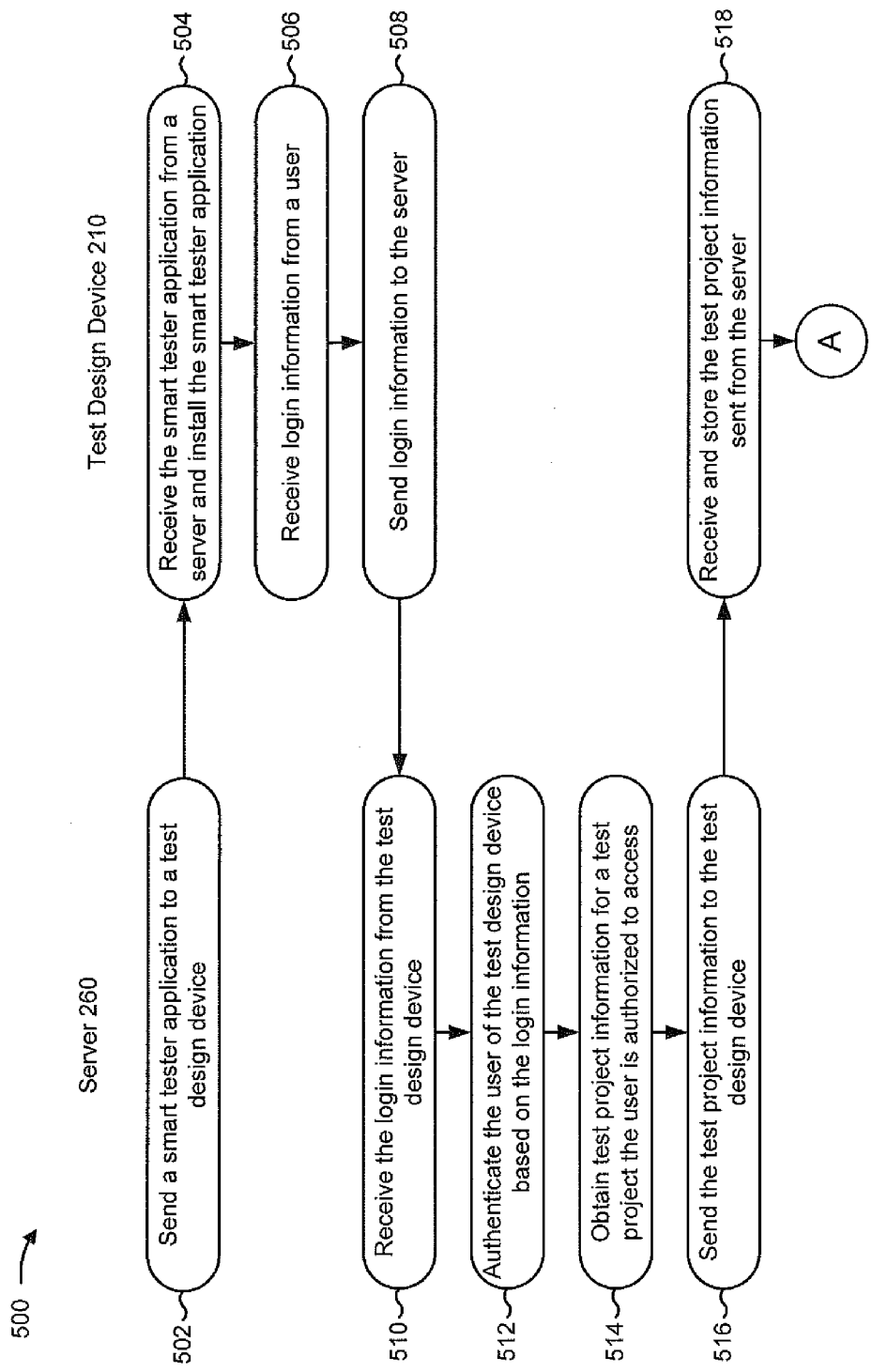
FIGS. 5A and 5B are flowcharts of an example process for generating test scripts for an application under test associated with a test project.
Figure 5B:
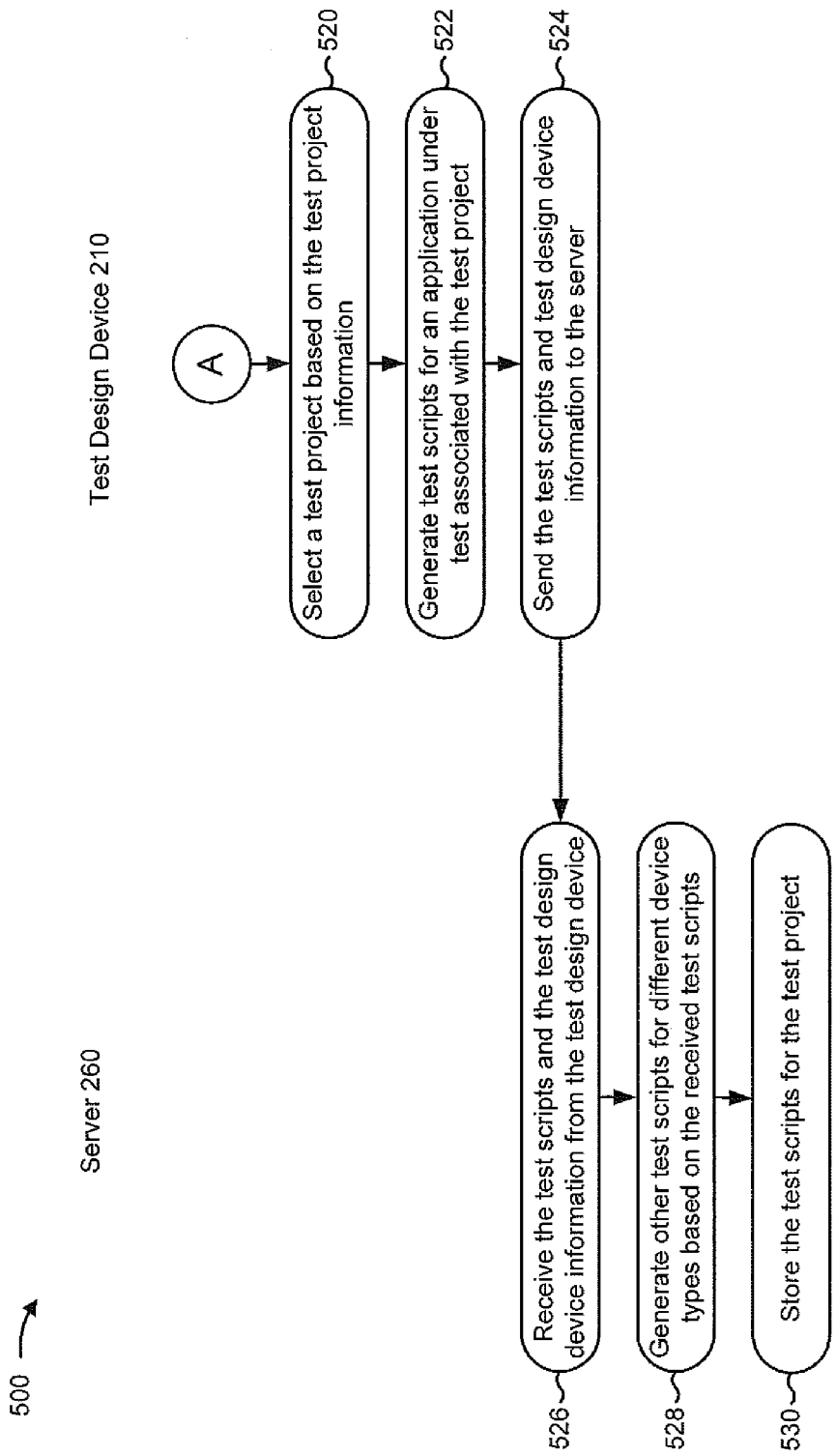

FIGS. 5A and 5B are flowcharts of an example process 500 for generating test scripts for an application under test associated with a test project. In some implementations, one or more process blocks of FIGS. 5A and 5B may be performed by test design device 210 and/or server 260. Additionally, or alternatively, one or more process blocks of FIGS. 5A and 5B may be performed by another device or a group of devices separate from or including test design device 210 and/or server 260.

As shown in FIG. 5A, process 500 may include sending a smart tester application to test design device 210 (block 502). For example, server 260 may send the smart tester application to test design device 210. In some implementations, test design device 210 may send a request to server 260 to provide the smart tester application. Server 260 may receive the request and send the smart tester application to test design device 210 based on the request. Additionally, or alternatively, server 260 may provide the smart tester application to a virtual application store and/or a website accessible by test design device 210 via network 250.

As further shown in FIG. 5A, process 500 may include receiving the smart tester application from server 260 and installing the smart tester application (block 504). For example, test design device 210 may receive the smart tester application sent by server 260. Additionally, or alternatively, test design device 210 may access the virtual application store and/or the website to which server 260 provided the smart tester application. Test design device 210 may download the smart tester application from the virtual application store and/or the website.

Test design device 210 may install the smart tester application on test design device 210.

As further shown in FIG. 5A, process 500 may include receiving login information from a user (block 506). For example, test design device 210 may receive the login information.

In some implementations, a user of test design device 210 (e.g., a test designer) may execute the smart tester application. The smart tester application may cause test design device 210 to prompt the user to input login information including user identifier information (e.g., a username) and authentication information for authenticating the user (e.g., a password, biometric information, etc.) into test design device 210. The user may input the login information into test design device 210 and test design device 210 may receive the login information.

As further shown in FIG. 5A, process 500 may include sending the login information to server 260 (block 508). For example, test design device 210 may send the login information to server 260.

As further shown in FIG. 5A, process 500 may include receiving the login information (block 510). For example, server 260 may receive the login information, including the user identifier information and/or the authentication information, sent by test design device 210.

As further shown in FIG. 5A, process 500 may include authenticating the user of test design device 210 based on the login information (block 512). For example, server 260 may authenticate the user by querying the account data structure using the user identifier information included in the login information and obtaining authentication information associated with the user identifier information from the account data structure. Server 260 may compare the authentication information included in the login information with the authentication information obtained from the account data structure. The user may not be authenticated as an authorized user if the authentication information included in the login information does not match the authentication information obtained from the account data structure. If the user is not authenticated as an authorized user, process 500 may end.

The user may be authenticated as an authorized user if the authentication information included in the login information matches the authentication information obtained from the account data structure. If the user is authenticated as an authorized user, process 500 may advance to block 514.

As further shown in FIG. 5A, process 500 may include obtaining test project information for a test project the user is authorized to access (block 514). For example, server 260 may obtain the test project information from the account data structure and/or the test project data structure.

The test project information may identify the test project, an application under test to be tested for the test project, and/or a user type of the user for the test project. The test project information may include information about one or more test projects the user is authorized to access. In process 500, assume the test project information indicates the user is a test designer for a test project.

As further shown in FIG. 5A, process 500 may include sending the test project information to test design device 210 (block 516). For example, server 260 may send the test project information to test design device 210.

As further shown in FIG. 5A, process 500 may include receiving and storing the test project information sent from server 260 (block 518). For example, test design device 210 may receive and store the test project information sent by server 260.

As shown in FIG. 5B, process 500 may include selecting a test project based on the test project information (block 520). For example, test design device 210 may select the test project from among the test projects identified by the test project information.

Test design device 210 may present information identifying test projects the user is authorized to access based on the test project information. The user may input, into test design device 210, a selection of a test project for which the user is designated a test designer. Test design device 210 may select the test project based on the input.

In some implementations, test design device 210 may determine whether an application under test, to be tested for the selected test project, is installed on test design device 210. If the application under test is not installed, test design device 210 may prompt the user to install the application under test and the user may operate test design device 210 to install the application under test. If the application under test is installed, process 500 may advance to block 522. Additionally, or alternatively, the application under test may be a web based application that does need to be installed on test design device 210. In such a case, test design device 210 may not determine whether the application under test is installed.

In some implementations, the smart tester application may cause test design device 210 to present information identifying applications installed on test design device 210. The user may input a selection of an application installed on test design device 210 as an application under test to be tested. In such a case, test design device 210 may send an instruction to server 260 to create a new test project associated with the selected application under test. Server 260 may perform blocks 404, 406, and 408 based on the instruction and create a new test project.

As further shown in FIG. 5B, process 500 may include generating test scripts for the application under test (block 522). For example, test design device 210 may generate the test scripts.

While the smart tester application is being executed, test design device 210 may execute the application under test to implement a test scenario. The user may implement the test scenario by interacting with the application under test, as the application under test is intended to be used, in a way that tests whether the application under test is working properly. The test scenario may include a series of interactions with the application under test via user input. For example, assume the application under test is a calculator application that displays a virtual keypad on a touchscreen. The user may select a "1" (e.g., an interaction) by touching a "1" button on the virtual keypad (e.g., an input), then select a "+" by touching a "+" button on the virtual keypad, then select a "2" by touching a "2" button on the virtual keypad, and then select a "=" by touching a "=" button on the virtual keypad to create a test scenario for testing whether the calculator application correctly computes 1+2=3. As the user is interacting with the application under test, the smart tester application may record all the interactions (e.g., user selections) and screen events (e.g., screen shots of a display, video recording of the display, audio recording of sound, etc.). It should be understood that a screen event could include a screen shot/video recording of an entire display, or a screen shot/video recording of a particular portion of a display, such as a region in which test activity is occurring.

The smart tester application may cause test design device 210 to generate test scripts based on the recorded interactions with the application under test and the recorded screen events. The test scripts may be information used to repeat the test scenario on other devices. The test scripts may include commands that, when executed by another device executing the application under test, cause the other device to repeat the test scenario by reproducing the interactions without the need for user input. For example, for the calculator application, test design device 210 may generate test scripts including a series of commands to select a "1," then select a "+," then select a "2," and then select a "=" without the need for a user to touch any buttons on the virtual keypad.

In some implementations, the commands included in the test scripts, used to cause the interactions without user input, may include object data, text data, and/or coordinate data derived from recording the interactions. For example, the object data may indicate an object selected (e.g., the "1" selected in the calculator application); the text data may indicate text (e.g., characters) input by the user; and the coordinate data may indicate coordinates of the object selected and/or the input text.

As further shown in FIG. 5B, process 500 may include sending the test scripts and test design device information to server 260 (block 524). For example, test design device 210 may send the test scripts and the test design device information.

The test design device information may indicate a device type of test design device 210. For example, the test design device information may include information identifying a make and/or a model of test design device 210, screen dimension information of test design device 210 (e.g., a length of a screen, a width of a screen, etc.), screen resolution information of test design device 210 (e.g., a pixel density, a number of pixels in a length direction, a number of pixels in a width direction, etc.), an operating system run by test design device 210, and/or operating system version run by test design device 210.

Furthermore, test design device 210 may generate and send the test scripts to server 260. Additionally, or alternatively, test design device 210 may send a record of the interactions to server 260, rather than the test scripts, for server 260 to generate the test scripts based on the record.

As further shown in FIG. 5B, process 500 may include receiving the test scripts and the test design device information from test design device 210 (block 526). For example, server 260 may receive the test scripts and the test design device information from test design device 210.

Additionally, or alternatively, server 260 may receive the record of the interactions from test design device 210. Server 260 may generate the test scripts based on the record.

As further shown in FIG. 5B, process 500 may include generating other test scripts for different device types based on the test scripts and the test design device information (block 528). For example, server 260 may generate other test scripts for device types different than the device type of test design device 210.

Server 260 may store mapping files that map or associate corresponding resources (e.g., objects, buttons, images, commands, etc.) between different device types. The mapping file may associate object data for a first device type with corresponding object data for a second device type. For example, a "back" button (e.g., an object) for one device type may correspond to a "home" button for another device type. In some implementations, the mapping file may associate coordinate data for a first device type with corresponding coordinate data for a second device type. For example, devices of different device types may have different screen sizes and/or resolutions, and coordinates X any Y for one device type may correspond to coordinates X' and Y' for another device type. Additionally, or alternatively, the mapping file may associate other kinds of data and/or corresponding resources for different device types.

The test script received from test design device 210 may be executed by other devices of the same device type as the device type of test design device 210. However, devices of other devices types may not be able to execute the same test script as the one generated by test design device 210. Accordingly, server 260 may generate other test scripts for repeating the test scenario on devices of different device types based on the received test scripts and the mapping files.

As further shown in FIG. 5B, process 500 may include storing the test scripts for the test project (block 530). For example, server 260 may store test scripts for each of multiple device types in the test project data structure for the test project selected at block 520. Server 260 may associate information identifying a device type with each of the test scripts for the test project.

While a series of blocks has been described with regard to FIGS. 5A and 5B, the blocks and/or the order of the blocks may be modified in some implementations. Additionally, or alternatively, non-dependent blocks may be performed in parallel.

Figure 6A:
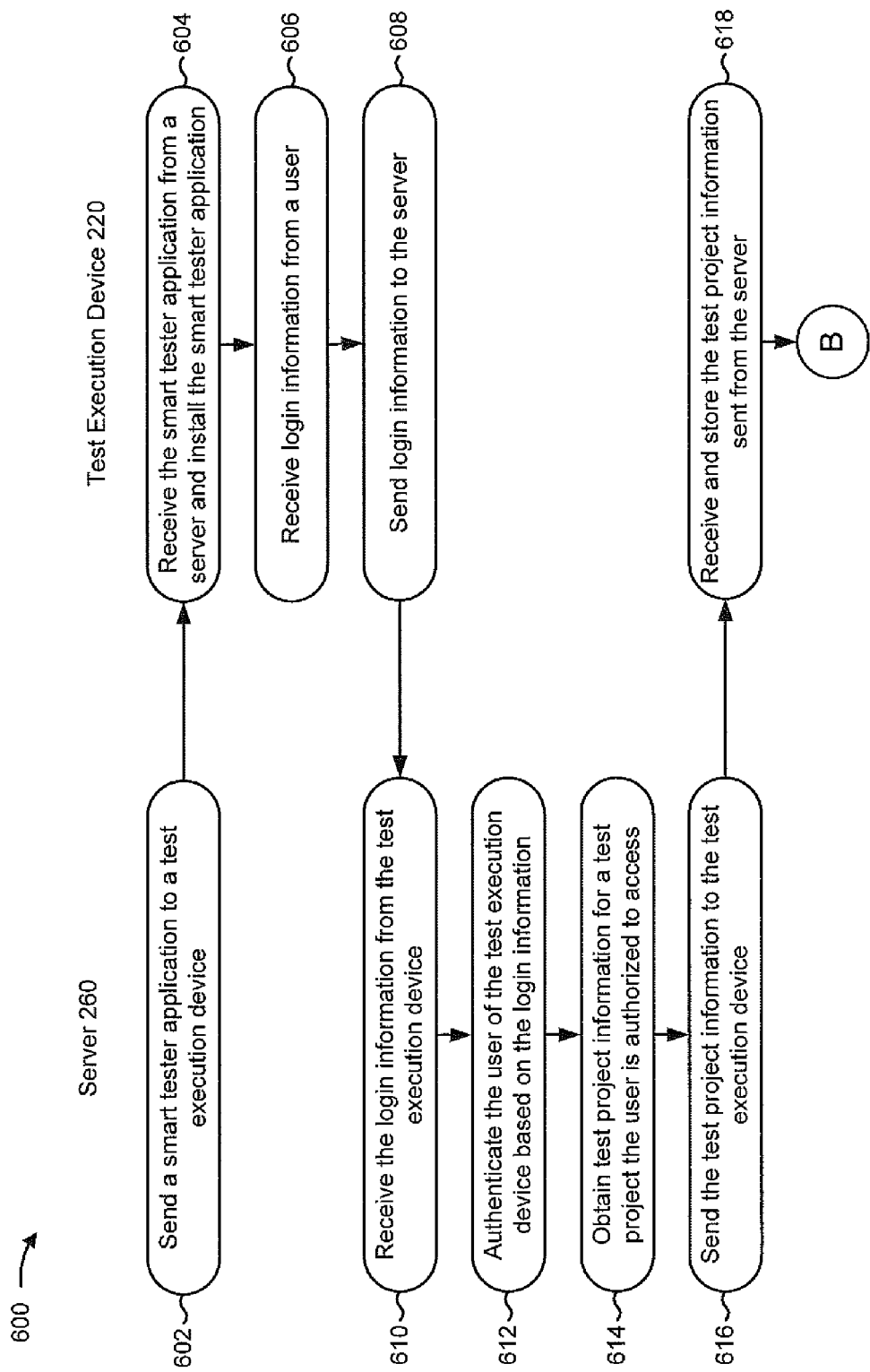
FIGS. 6A and 6B are flowcharts of an example process for executing test scripts for an application under test associated with a test project.
Figure 6B:
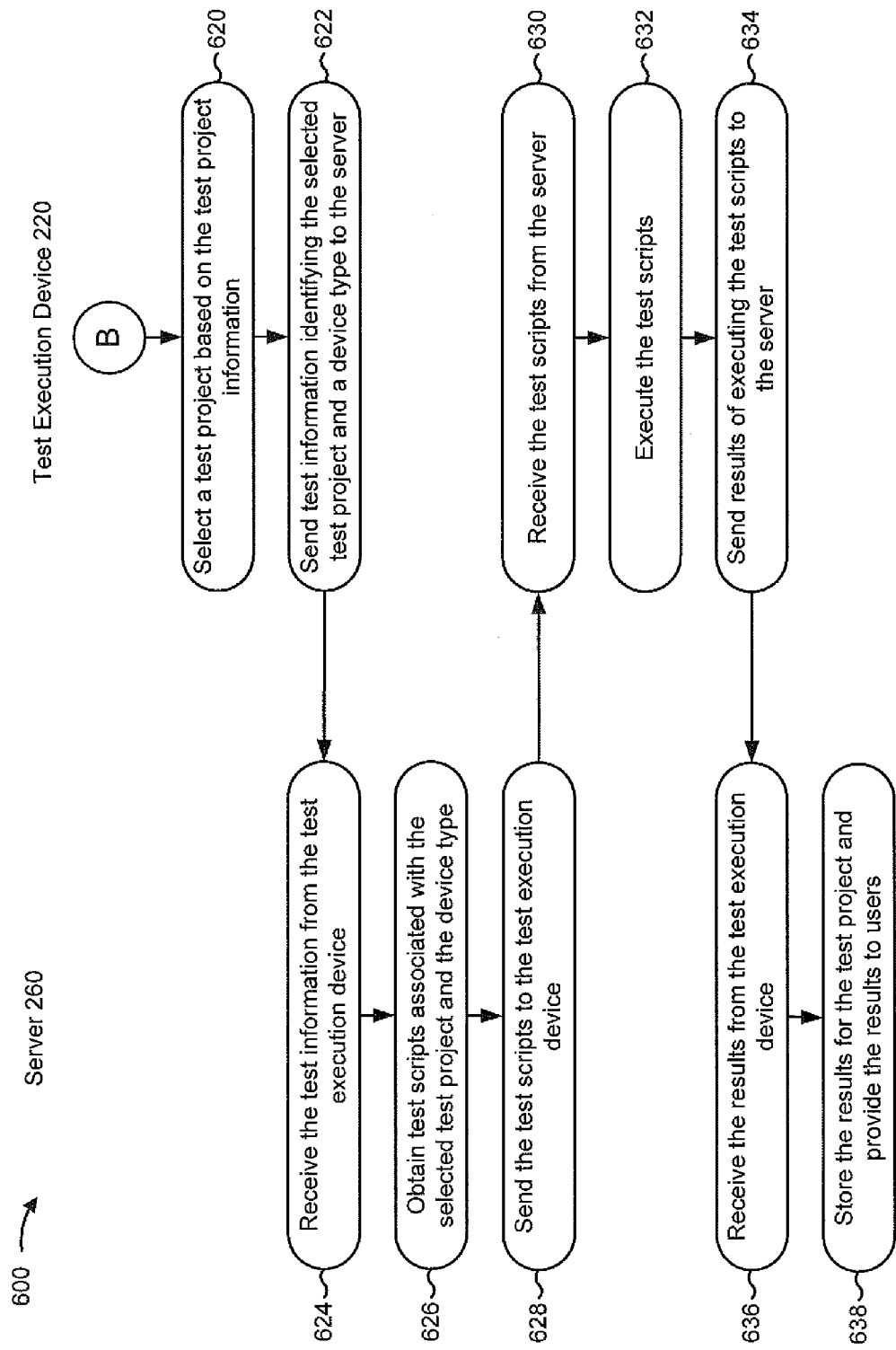

FIGS. 6A and 6B are flowcharts of an example process 600 for executing test scripts for an application under test associated with a test project. In some implementations, one or more process blocks of FIGS. 6A and 6B may be performed by test execution device 220 and/or server 260. Additionally, or alternatively, one or more process blocks of FIGS. 6A and 6B may be performed by another device or a group of devices separate from or including test execution device 220 and/or server 260.

As shown in FIG. 6A, process 600 may include sending a smart tester application to test execution device 220 (block 602). For example, server 260 may send by the smart tester application to test execution device 220. In some implementations, test execution device 220 may send a request to server 260 to provide the smart tester application. Server 260 may receive the request and send the smart tester application to test execution device 220 based on the request. Additionally, or alternatively, server 260 may provide the smart tester application to a virtual application store and/or a website accessible by test execution device 220 via network 250.

As further shown in FIG. 6A, process 600 may include receiving the smart tester application from server 260 and installing the smart tester application (block 604). For example, test execution device 220 may receive the smart tester application sent by server 260. Additionally, or alternatively, test execution device 220 may access the virtual application store and/or the website to which server 260 provided the smart tester application. Test execution device 220 may download the smart tester application from the virtual application store and/or the website.

Test execution device 220 may install the smart tester application on test execution device 220.

As further shown in FIG. 6A, process 600 may include receiving login information from a user (block 606). For example, test execution device 220 may receive the login information.

In some implementations, a user of test execution device 220 (e.g., a test executor) may execute the smart tester application. The smart tester application may cause test execution device 220 to prompt the user to input login information including user identifier information (e.g., a username) and authentication information for authenticating the user (e.g., a password, biometric information, etc.) into test design device 210. The user may input the login information into test execution device 220 and test execution device 220 may receive the login information.

As further shown in FIG. 6A, process 600 may include sending the login information to server 260 (block 608). For example, test execution device 220 may send the login information to server 260.

As further shown in FIG. 6A, process 600 may include receiving the login information (block 610). For example, server 260 may receive the login information, including the user identifier information and/or the authentication information, sent by test execution device 220.

As further shown in FIG. 6A, process 600 may include authenticating the user of test execution device 220 based on the login information (block 612). Server 260 may authenticate the user by querying the account data structure using the user identifier information included in the login information and obtaining authentication information associated with the user identifier information from the account data structure. Server 260 may compare the authentication information included in the login information with the authentication information obtained from the account data structure. The user may not be authenticated as an authorized user if the authentication information included in the login information does not match the authentication information obtained from the account data structure. If the user is not authenticated as an authorized user, process 600 may end.

The user may be authenticated as an authorized user if the authentication information included in the login information matches the authentication information obtained from the account data structure. If the user is authenticated as an authorized user, process 600 may advance to block 614.

As further shown in FIG. 6A, process 600 may include obtaining test project information for a test project the user is authorized to access (block 614). For example, server 260 may obtain the test project information from the account data structure and/or the test project data structure.

The test project information may identify the test project, an application under test to be tested for the test project, and/or a user type of the user for the test project. The test project information may include information about one or more test projects the user is authorized to access. In process 600, assume the test project information indicates the user is a test executor for a test project.

As further shown in FIG. 6A, process 600 may include sending the test project information to test execution device 220 (block 616). For example, server 260 may send the test project information to test execution device 220.

As further shown in FIG. 6A, process 600 may include receiving the test project information sent from server 260 (block 618). For example, test execution device 220 may receive the test project information sent by server 260.

As shown in FIG. 6B, process 600 may include selecting a test project based on the test project information (block 620). For example, test execution device 220 may select the test project from among the test projects identified by the test project information.

Test execution device 220 may present information identifying test projects the user is authorized to access based on the test project information. The user may input, into test execution device 220, a selection of a test project for which the user is designated a test executor. Test execution device 220 may select the test project based on the input.

In some implementations, test execution device 220 may determine whether an application under test to be tested for the selected test project is installed on test execution device 220. If the application under test is not installed, test execution device 220 may prompt the user to install the application under test and the user may operate test execution device 220 to install the application under test. If the application under test is installed, process 600 may advance to block 622. Additionally, or alternatively, the application under test may be a web based application that does need to be installed on test execution device 220. In such a case, test execution device 220 may not determine whether the application under test is installed.

As further shown in FIG. 6B, process 600 may include sending test information identifying the selected test project and identifying a device type of test execution device 220 to server 260 (block 622). For example, test execution device 220 may send the test information to server 260.

The test information may identify the device type by identifying a make and/or a model of test execution device 220, screen dimension information of test execution device 220 (e.g., a length of the screen, a width of the screen, etc.), screen resolution information of test execution device 220 (e.g., a pixel density, a number of pixels in a length direction, a number of pixels in a width direction, etc.), an operating system run by test execution device 220, and/or operating system version run by test execution device 220.

As further shown in FIG. 6B, process 600 may include receiving the test information from test execution device 220 (block 624). For example, server 260 may receive the test information that identifies the selected test project and the device type of test execution device 220. In some implementations, server 260 may receive test information from multiple test execution devices 220 that are used to execute test scripts for the test project.

As further shown in FIG. 6B, process 600 may include obtaining test scripts associated with the selected test project and the device type of test execution device 220 (block 626). For example, server 260 may obtain the test scripts by querying the test project data structure using the test project identified by the test information. Server 260 may access the test project and obtain test scripts for the device type identified by the test information. Accordingly, server 260 may obtain test scripts for the device type of test execution device 220.

As further shown in FIG. 6B, process 600 may include sending the test scripts to test execution device 220 (block 628). For example, server 260 may send the test scripts via the smart tester application. In some implementations, server 260 may email the test scripts based on contact information included in the user's account. Additionally, or alternatively, server 260 may send test scripts to multiple test execution devices 220 so that the test scripts may be executed on multiple test execution devices 220 of different device types and/or at different locations.

As further shown in FIG. 6B, process 600 may include receiving the test scripts from server 260 (block 630). For example, test execution device 220 may receive the test scripts sent from server 260 via the smart tester application. In some implementations, test execution device 220 may receive the test scripts via email.

The test scripts received by test execution device 220 may have been generated to be executed on the device type of test execution device 220. Furthermore, the test scripts received by test execution device 220 may have been generated based on the test scripts generated by test design device 210 in process 500 of FIGS. 5A and 5B.

As further shown in FIG. 6B, process 600 may include executing the test scripts (block 632). For example, test execution device 220 may execute the test scripts.

The smart tester application may cause test execution device 220 to prompt the user to select a mode to execute the test scripts. For example, the user may be prompted to select from an automation mode, a manual mode, and/or a hybrid mode.

In some implementations, the user may select the automation mode to execute the test scripts. In the automation mode, test execution device 220 may execute the application under test and the test scripts to automatically reproduce the test scenario. In other words, all the interactions with the application under test recorded by test design device 210 would be sequentially repeated on test execution device 220 without the user having to input the interactions. For example, assume the application under test is the calculator application as previously discussed. Further, assume the test scripts include a series of commands to select a "1," then select a "+," then select a "2," and then select a "=" to reproduce the test scenario for testing whether the calculator application correctly computes 1+2=3. The test scripts may execute commands on the application under test to select the "1," then the "+," then the "2," and then the "=" without the user having to input anything. While the test scenario is being reproduced, test execution device 220 may record a screen event (e.g., a screen shot of at least a portion of a display, a video recording of a portion of the display, an audio recording of sound input/output, etc.) for each of the reproduced interactions. For example, test execution device 220 may record a screen shot after the command to select the "=" is executed to ensure the correct answer of "3" is displayed. Test execution device 220 may generate results of executing the test scripts that include the recorded screen events.

In some implementations, the user may select the manual mode to execute the test scripts. In the manual mode, the smart tester application may provide the user the ability to start, stop, pause, and/or resume the execution of the test scripts so as to add comments and/or feedback to the recorded screen events. For example, assume the application under test is the calculator application and the test scripts are for reproducing the test scenario that tests whether the calculator application correctly computes 1+2=3. The user may provide an input to start execution of the test scripts, and test execution device 220 may automatically start executing the commands. The user may provide an input to pause the test scripts after the command to select the "2" is executed. At this time, assume test execution device 220 records a screen shot of the display displaying a "2." The user may add a comment such as "pass" to the screen shot because the calculator application properly displayed "2" after the command to input the "2" was executed. The user may then provide an input to resume execution of the test scripts. Test execution device 220 may continue to execute the test scripts and the command to select the "=" may be automatically executed. The user may provide another input to pause the execution of the test scripts after the command to select the "=" is executed. At this time, assume the test execution device records a screen shot of the display displaying a "4." The user may add a comment to the screen shot such as "fail" and/or a comment explaining the calculator performed improperly by displaying a "4" instead of a "3." Test execution device 220 may generate results of executing the test scripts that include the recorded screen events with the added comments.

In some implementations, the user may select the hybrid mode to execute the test scripts. In the hybrid mode, test execution device 220 may execute the test scripts as performed in the automation mode and add comments as done in the manual mode. Test execution device 220 may execute the test scripts to automatically reproduce the test scenario and record all the screen events as done in the automation mode. After the test scenario has been reproduced, test execution device 220 may prompt the user to add comments and/or feedback to one or more of the recorded screen events as done in the manual mode. For example, the user may browse through the recorded screen events and open a recorded screen event to add a comment to the screen event. Test execution device 220 may generate results of executing the test scripts that include the recorded screen events with the added comments. Alternatively, the results may include the recorded screen events without added comments.

Accordingly, the user may provide comments that identify screen events that pass and/or fail and provide details as to why the screen events pass and/or fail. The comments may facilitate review of the screen captures by a developer working to resolve problems with the application under test by pointing out where the problems are located in the application under test and/or what the problems are in the application under test. Additionally, or alternatively, the comments may facilitate the generation of an overview of the test results (e.g., an overview indicating how many failed screen shots and/or problems with the application under test).

As further shown in FIG. 6B, process 600 may include sending the results of executing the test scripts to server 260 (block 634). For example, test execution device 220 may send the results to server 260.

As further shown in FIG. 6B, process 600 may include receiving the results from test execution device 220 (block 636). For example, server 260 may receive the results sent by test execution device 220. In some implementations, server 260 may receive results from multiple test execution devices 220 that executed the test scripts for the test project.

As further shown in FIG. 6B, process 600 may include storing the results for the test project and providing the results to users (block 638). For example, server 260 may store the results for the test project from one or more test execution devices 220 in the test project data structure.

Server 260 may generate one or more test reports based on the results and store the one or more test results in the test project data structure. In some implementations, a test report may include merged results from multiple test execution devices 220. Additionally, or alternatively, the test report may include results for one test performed by a test execution device 220. In some implementations, the test results may indicate the device type and/or the specific test execution device 220 that generated the results. Additionally, or alternatively, the test report may indicate a location where the test scripts were executed.

In some implementations, test reports including different information may be generated for different types of users. For example, server 260 may generate a detailed report for a developer that includes all the results (e.g., all the recorded screen captures and/or comments). On the other hand, server 260 may generate an overview report for stakeholders and/or test managers that summarizes the results (e.g., how many screen captures passed and/or failed).

A user (e.g., a viewer) may log into the test project via the smart tester application (e.g., on test design device 210 and/or test execution device 220) and/or via a web interface (e.g., on test design device 210, test execution device 220, test management device 230, and/or another device) and send a request to server 260 to provide a test report for the test project. Server 260 may authenticate that the user is authorized to access a test report for the test project based on the user's account. If the user is authorized to access the test report, server 260 may send the test report to the user via a device used by the user (e.g., test design device 210, test execution device 220, test management device 230, and/or another device). In some implementations, server 260 may determine a user type of the user for the test project based on the user's account and/or the test project and provide a test report to the user based on the user type. For example, server 260 may provide a detailed report to a developer and may provide an overview report to a stakeholder. The user may receive the test report and use the test report in any desired way. For example, a developer may use the test report to identify problems (e.g., "bugs") with how the application under test is executed on certain device types, and may reprogram the application under test to fix the problems based on the test report. Additionally, or alternatively a stakeholder may use the test report to determine budgets and/or timelines for fixing the application under test.

While a series of blocks has been described with regard to FIGS. 6A and 6B, the blocks and/or the order of the blocks may be modified in some implementations. Additionally, or alternatively, non-dependent blocks may be performed in parallel.

Figure 7A:
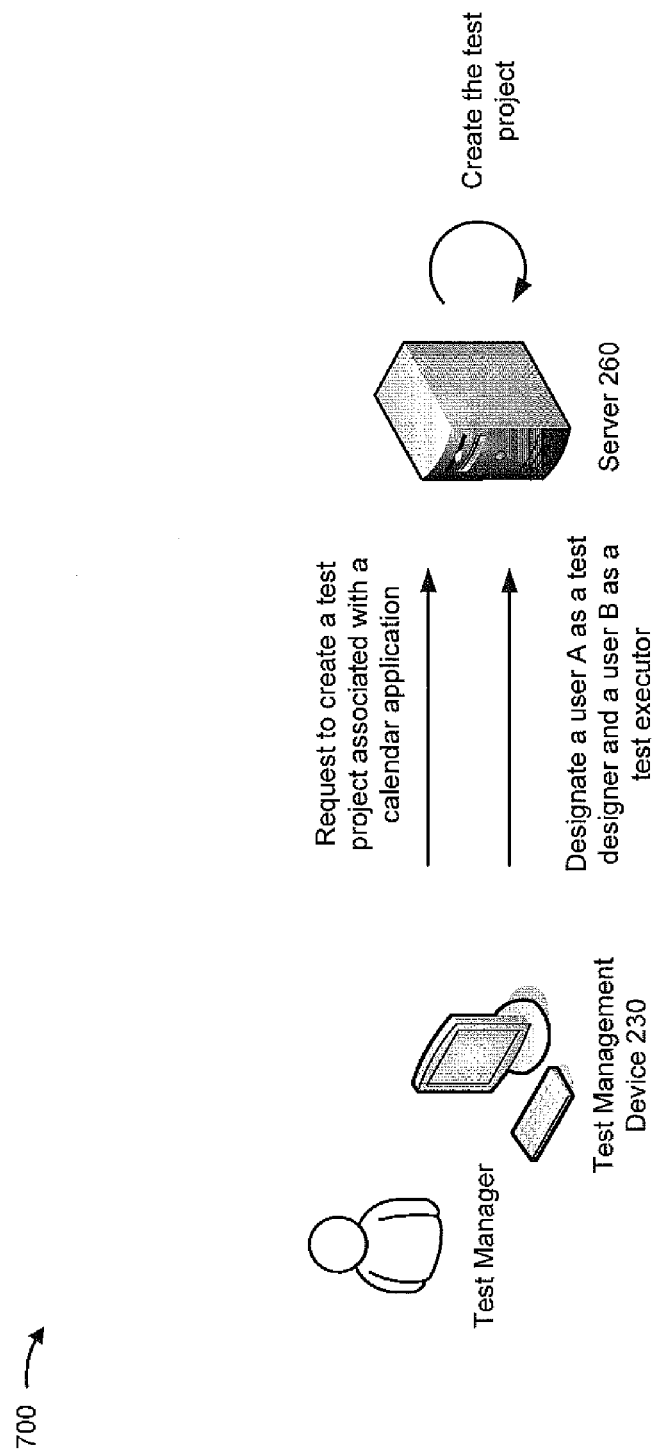
FIGS. 7A to 7C are diagrams of an example implementation relating to the processes shown in FIGS. 4 to 6B.
Figure 7B:
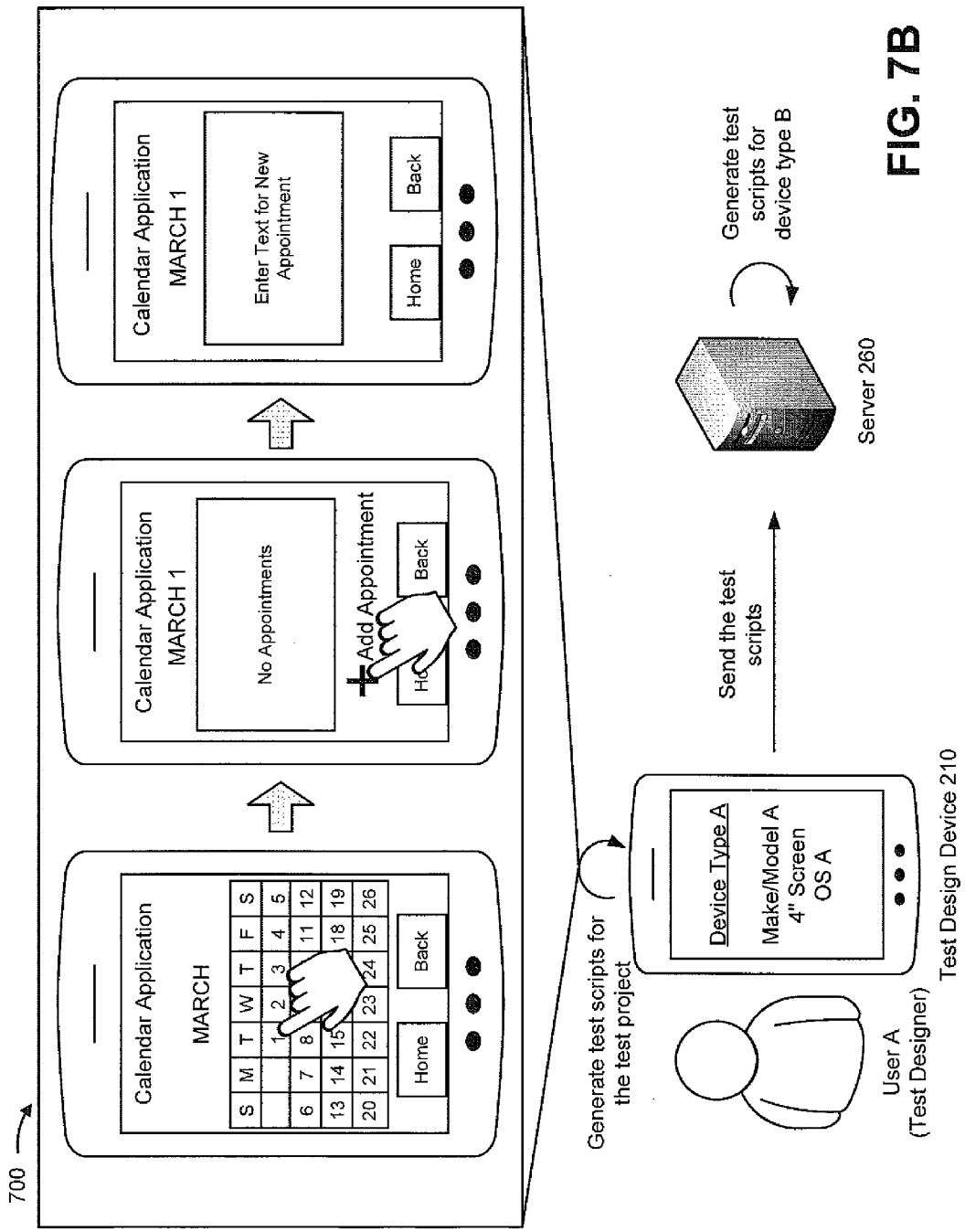
Figure 7C:
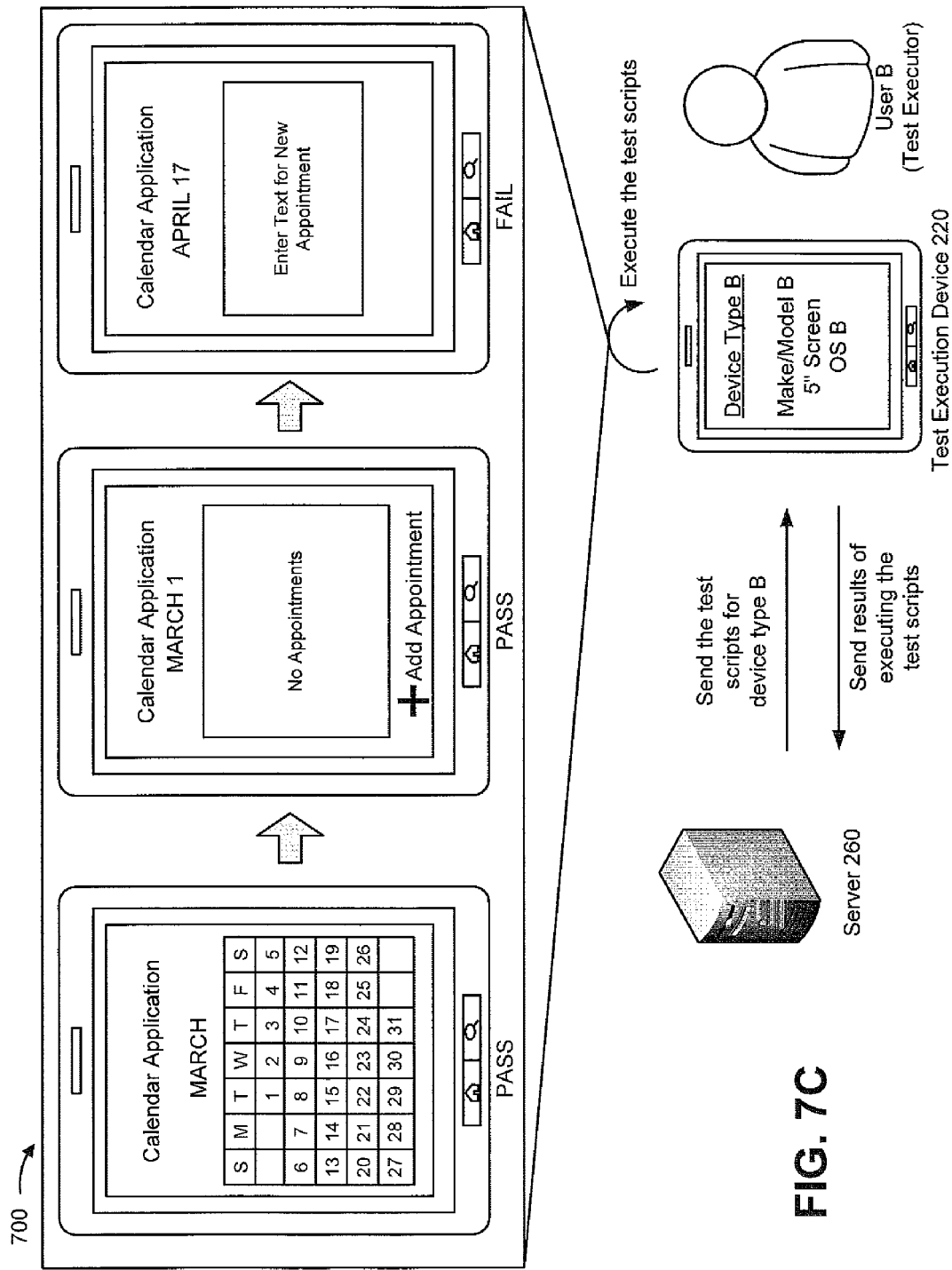

FIGS. 7A to 7C are diagrams of an example implementation 700 relating to processes 400, 500, and 600 shown in FIGS. 4 to 6B.

As shown in FIG. 7A, a user (e.g., a test manager) may use test management device 230 to send a request to create a test project for testing a calendar application to server 260. Additionally, or alternatively, the user may send user information to server 260 that designates a user A as a test designer for the test project and a user B as a test executor for the test project.

Server 260 may receive the request to create the test project and the user information. Server 260 may create a test project based on the request. For example, the test project may identify the calendar application as the application under test (e.g., the application to be tested). Additionally, or alternatively, the test project may identify user A as test designer for the test project and user B as a test executor for the test project.

As shown in FIG. 7B, user A may operate test design device 210 (e.g., a smart phone) of a device type A. Device type A may correspond to a make and model A that has a 4 inch screen and executes an operating system (OS) A. Assume user A executes a smart tester application installed on test design device 210. User A may use test design device 210 to send login information to server 260 via the smart tester application. Server 260 may receive the login information and authenticate user A. Server 260 may determine that user A is designated as a test designer for the test project based on the login information and the test project. Server 260 may send test project information to test design device 210 indicating user A is a test designer for the test project that tests the calendar application.

Test design device 210 may receive the test project information. User A may operate test design device 210 to generate test scripts for the test project based on the test project information. Assume user A desires to implement a test scenario for testing whether the calendar application properly adds a new appointment on March 1. Further, assume user A executes the calendar application on test design device 210 while the smart tester application is being executed.

As shown in FIG. 7B, a screen included in test design device 210 may display a calendar for the month of March. User A may input a command to select March 1 by touching the "1" displayed on the screen. Based on the input, the calendar application may cause the screen to display a view of the appointments scheduled for March 1 and an object (e.g., the "+" object) allowing user A to add a new appointment. User A may input a command to add a new appointment by touching the "+" object. Based on the input, the calendar application may cause the screen to display a view prompting user A to enter text for the new appointment. The smart tester application may record the interactions with the calendar application (e.g., record selections of March 1 and then add a new appointment). Test design device 210 may generate the test scripts based on the recorded interactions and send the test scripts to server 260. In some implementations, the test scripts may be specific to device type A because a device of device type A (e.g., test design device 210) was used to generate the test scripts.

As further shown in FIG. 7B, server 260 may receive the test scripts from test design device 210. Server 260 may generate other test scripts for other device types (e.g., a device type B) based on the test scripts received from test design device 210 and mapping files stored by server 260.

As shown in FIG. 7C, user B may operate test execution device 220 (e.g., a smart phone) of a device type B. Device type B may correspond to a make and model B that has a 5 inch screen and executes an operating system (OS) B. Assume user B executes a smart tester application installed on test execution device 220. User B may use test execution device 220 to send login information and device information, indicating user B is using a device of device type B, to server 260 via the smart tester application. Server 260 may receive the login information and the device information. Server 260 may determine that user B is designated a test executor for the test project based on the login information and the test project. Server 260 may obtain test scripts for the calendar application associated with device type B based on the device information. Server 260 may provide the test scripts to test execution device 220.

Test execution device 220 may receive the test scripts associated with device type B. The test scripts may cause test execution device 220 to reproduce the test scenario for testing whether the calendar application properly adds a new appointment on March 1. For example, assume user B operates the smart tester application to execute the test scripts in the hybrid mode. As shown in FIG. 7C, the test scripts may cause a screen included in test execution device 220 to display a calendar for the month of March. Test execution device 220 may record a first screen shot (e.g., a screen event) of the screen. The test scripts may automatically execute a command to select March 1 without user B having to touch the "1" displayed on the screen. Based on the command, the calendar application may cause the screen to display a view of the appointments scheduled for March 1 and an object (e.g., the "+" object) for adding a new appointment. Test execution device 220 may record a second screen shot of the screen at this time. The test scripts may automatically execute a command to add a new appointment without user B having to touch the "+" object displayed on the screen. Based on the command, the calendar application may cause the screen to display a view prompting user B to enter text for the new appointment. However, assume the screen improperly displays "April 17" instead of "March 1" due to a problem with the calendar application. Test execution device 220 may record a third screen shot of the screen at this time.

Once test execution device 220 finishes executing the test scripts, the smart tester application may give user B the opportunity to add comments to the recorded screen shots. For example, user B may add a "pass" comment to the first and second screen shots because the screen shots illustrate the calendar application performing properly. On the other hand, user B may add a "fail" comment to the third screen shot because the third screen shot illustrates the calendar application not performing properly (e.g., displaying "April 17" instead of "March 1"). Test execution device 220 may generate results including the screen shots and the comments. Test execution device 220 may send the results to server 260.

Server 260 may receive the results from test execution device 220 and store the results. Sever 260 may provide the results to an appropriate party. For example, server 260 may provide the results to a developer that programs the calendar application. The developer may receive the results which indicate the problem of displaying "April 17" instead of "March 1" when the calendar application is executed on a device of device type B. The developer may reprogram the calendar application to fix the problem based on the results.

Accordingly, the calendar application may be tested on a device of device type B without the test designer personally having to execute a test on a device of device type B.

Implementations described herein may provide a smart tester application for testing an application under test across multiple device types and multiple geographic locations. In some implementations, the smart tester application may allow an expert tester (e.g., a test designer) to generate a test used for testing different devices. Moreover, the smart tester application may allow non-expert testers (e.g., test executors) to execute the test, generated by the expert tester, on different devices in different geographic locations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be an open-ended terms. Further, the phrase "based on" is intended to mean "based, at least in part, on" unless explicitly stated otherwise.

What is claimed is:

1. A device, comprising:
   one or more processors to:
      receive, from a first device of a first device type, first test scripts for testing an application,
         the first test scripts including information for reproducing interactions with the application on devices of the first device type,
         the first test scripts including at least one of first object data, specific to the first device type, or first coordinate data, specific to the first device type, derived from recording the interactions with the application on the first device;
      generate second test scripts, for testing the application on devices of a second device type, that reproduce the interactions with the application on the devices of the second device type,
         the second test scripts including at least one of second object data, specific to the second device type and corresponding to the first object data, or second coordinate data, specific to the second device type and corresponding to the first coordinate data,
         the second test scripts being generated based on the second device type, the first test scripts, and mapping information that maps at least one of corresponding object data or corresponding coordinate data between the first device type and the second device type,
         the first device type and the second device type being different device types;
      receive information that indicates a second device is of the second device type;
      provide the second test scripts to the second device based on the second device being of the second device type;
      receive test results of executing the second test scripts on the second device that indicate results of reproducing the interactions with the application on the second device; and
      store the test results.

2. The device of claim 1, where the second test scripts include information that causes the second device to automatically reproduce the interactions with the application without user input for each of the interactions.

3. The device of claim 1, where the first test scripts include first text data, derived from recording the interactions with the application on the first device, and
   where the second test scripts include second text data corresponding to the first text data.

4. The device of claim 1, where the one or more processors are further to:
   generate a plurality of test scripts for testing the application on a plurality of devices of different device types,
      the plurality of test scripts including the second test scripts and the plurality of devices including the second device;
   provide the plurality of test scripts to the plurality of devices; and
   receive a plurality of test results from the plurality of devices that indicate a plurality of results of reproducing the interactions on the plurality of devices,
      the plurality of test results including the test results.

5. The device of claim 1, where the one or more processors are further to:
provide the test results for display by a third device.

6. The device of claim 1, where the test results include a recording of a screen event on the second device that was recorded after at least one of the interactions was reproduced on the second device.

7. The device of claim 6, where the test results include a comment associated with the recording of the screen event.

8. The device of claim 1, where the one or more processors are further to:
create a test project associated with the application,
the test project including information identifying a test designer authorized to generate the first test scripts; and
authenticate that a user of the first device is the test designer,
the first test scripts being received from the first device based on the user being authenticated.

9. The device of claim 1, where the one or more processors are further to:
create a test project associated with the application,
the test project including information identifying a test executor authorized to execute the second test scripts; and
authenticate that a user of the second device is the test executor,
the second test scripts being provided to the second device based on the user being authenticated.

10. The device of claim 1, where the test results include an image displayed by the second device.

11. A computer-readable medium storing instructions, the instructions comprising:
a plurality of instructions that, when executed by a processor of a device, cause the processor to:
receive, from a first device of a first device type, first test scripts for testing an application,
the first test scripts including information for automatically reproducing interactions with the application on devices of the first device type,
the first test scripts including at least one of first object data, specific to the first device type, or first coordinate data, specific to the first device type, derived from recording the interactions with the application on the first device;
create second test scripts, for testing the application on devices of a second device type, that automatically reproduce the interactions with the application on the devices of the second device type,
the second test scripts including at least one of second object data, specific to the second device type and corresponding to the first object data, or second coordinate data, specific to the second device type and corresponding to the first coordinate data,
the second test scripts being generated based on the second device type, the first test scripts, and mapping information that associates at least one of corresponding object or corresponding coordinate data between the first device type and the second device type,
the first device type and the second device type being different device types;
receive information that indicates a second device is of the second device type;
send the second test scripts to the second device based on the second device being of the second device type;
receive test results of executing the second test scripts on the second device that indicate results of automatically reproducing the interactions with the application on the second device; and
store the test results.

12. The computer-readable medium of claim 11, where the plurality of instructions further cause the processor to:
provide the first device with a smart tester application that causes the first device to generate the first test scripts.

13. The computer-readable medium of claim 11, where the plurality of instructions further cause the processor to:
receive login information from the first device; and
provide test project information based on the login information,
the test project information identifying the application to be tested.

14. The computer-readable medium of claim 13, where the plurality of instructions further cause the processor to:
provide the first device with a smart tester application that causes the first device to determine that the application identified by the test project information is not installed on the first device and to prompt a user of the first device to install the application.

15. The computer-readable medium of claim 11, where the application is a web based application.

16. The computer-readable medium of claim 11, where the test results include an image displayed by the second device.

17. A method, comprising:
receiving, by a server device, first test scripts for testing an application from a first device of a first device type,
the first test scripts including information for reproducing interactions with the application on devices of the first device type,
the first test scripts including at least one of first object data, specific to the first device type, or first coordinate data, specific to the first device type, derived from recording the interactions with the application on the first device;
storing, by the server device, mapping information that maps at least one of corresponding object data or corresponding coordinate data between the first device type and a second device type,
the first device type and the second device type being different device types;
generating, by the server device, second test scripts, for testing the application on devices of the second device type, that reproduce the interactions with the application on the devices of the second device type,
the second test scripts being generated based on the second device type, the first test scripts, and the mapping information,
the second test scripts including at least one of second object data, specific to the second device type and corresponding to the first object data, or second coordinate data, specific to the second device type and corresponding to the first coordinate data;
receiving, by the server device, information that indicates a second device is of the second device type;
providing, by the server device, the second test scripts to the second device based on the second device being of the second device type;

receiving, by the server device, test results of executing the second test scripts on the second device that indicate results of reproducing the interactions with the application on the second device; and storing, by the server device, the test results.

18. The method of claim 17, where the test results include an image displayed by the second device.

19. The method of claim 18, where the test results include a comment associated with the image and input by a user of the second device.

20. The method of claim 17, further comprising:

providing a smart tester application to the second device including instructions for causing the second device to:

execute the second test scripts;

receive a first input to pause execution of the test second scripts;

pause execution of the second test scripts based on the first input;

receive a user inputted comment to be added to a recorded screen event while execution of the second test scripts is paused;

add the comment to the recorded screen event;

receive a second input to resume execution of the second test scripts; and resume execution of the second test scripts based on the second input.

\* \* \* \* \*